US012547969B2

(12) United States Patent
Davies et al.

(10) Patent No.: US 12,547,969 B2
(45) Date of Patent: Feb. 10, 2026

(54) SYSTEMS, APPARATUSES AND METHODS FOR A TIERED STRUCTURE TO MANAGE A CHAIN OF CUSTODY FOR PACKAGE DELIVERY

(71) Applicant: American Honda Motor Co., Inc., Torrance, CA (US)

(72) Inventors: Jamie Davies, Huntington Beach, CA (US); Devon J Fujioka, Los Angeles, CA (US)

(73) Assignee: American Honda Motor Co., Inc., Torrance, CA (US)

(*) Notice: Subject to any disclaimer, the term of this patent is extended or adjusted under 35 U.S.C. 154(b) by 0 days.

(21) Appl. No.: 18/442,920

(22) Filed: Feb. 15, 2024

(65) Prior Publication Data
US 2025/0265536 A1    Aug. 21, 2025

(51) Int. Cl.
*G06Q 10/0833* (2023.01)
(52) U.S. Cl.
CPC ................... *G06Q 10/0833* (2013.01)
(58) Field of Classification Search
CPC ............ G06Q 10/0833; G06Q 10/083; G06Q 10/087; G06Q 10/0841; G06Q 10/0843; G06Q 10/08365; G06Q 30/0633; G06Q 30/0635; G06Q 50/40; G06Q 50/60
See application file for complete search history.

(56) References Cited

U.S. PATENT DOCUMENTS

| | | | |
|---|---|---|---|
| 7,484,391 B1* | 2/2009 | Moore | E05B 81/58 292/155 |
| 7,484,663 B2 | 2/2009 | Olsen, III et al. | |
| 8,010,463 B2 | 8/2011 | Gillen | |
| 8,340,814 B2 | 12/2012 | Hamilton | |
| 10,062,047 B2 | 8/2018 | Kadaba et al. | |
| 10,643,170 B2 | 5/2020 | Lee et al. | |

(Continued)

FOREIGN PATENT DOCUMENTS

| | | |
|---|---|---|
| KR | 20210096719 A | 8/2021 |
| KR | 20230117803 A | 8/2023 |
| WO | 2021240236 A1 | 12/2021 |

OTHER PUBLICATIONS

Tenders Monitor Africa-Asia, "Transportation Services for Health Commodities," Syndigate Media Inc., Oct. 8, 2018.*

*Primary Examiner* — Nathan Erb
(74) *Attorney, Agent, or Firm* — Aaron Fong; American Honda Motor Co., Inc.

(57) ABSTRACT

The present disclosure relates to systems, apparatuses and methods for a tiered structure to manage a chain of custody for package delivery. More particularly, this disclosure describes a last mile transporter for package deliveries whereby package whereabouts are monitored through transmitters. In an illustrative embodiment, a vehicle, last mile transporter, and container each have a transmitter. The three transmitters may be used for tracking a package that is placed in the container. A chain of custody may be created when the at least one package is placed in the container. The container may be placed atop the last mile transporter. There is thus a relationship between the container and the transporter. In turn, the vehicle may also be in communication with the container and the transporter. Each device may be used to manage the package location through their appropriate transmitters.

8 Claims, 8 Drawing Sheets

(56) References Cited

U.S. PATENT DOCUMENTS

| | | |
|---|---|---|
| 10,853,764 B2 | 12/2020 | Durkee et al. |
| 10,901,418 B2 | 1/2021 | Brady et al. |
| 11,379,783 B2 | 7/2022 | Cho et al. |
| 11,435,744 B2* | 9/2022 | Cooper ................ G08G 5/0034 |
| 11,580,684 B2 | 2/2023 | Dotterweich et al. |
| 11,605,052 B2 | 3/2023 | Hwang et al. |
| 11,803,807 B2 | 10/2023 | Hall et al. |
| 2005/0061878 A1* | 3/2005 | Barenburg ....... G06K 19/06046 |
| | | 235/385 |
| 2006/0107295 A1* | 5/2006 | Margis ............... H04N 21/2223 |
| | | 348/E7.071 |
| 2012/0173448 A1* | 7/2012 | Rademaker ...... G06Q 10/08355 |
| | | 705/338 |
| 2016/0016628 A1* | 1/2016 | Thompson ............. B62K 23/06 |
| | | 280/278 |
| 2017/0284128 A1* | 10/2017 | Lim .................. G07C 9/00309 |
| 2019/0220044 A1* | 7/2019 | Ruth ...................... B64U 80/86 |
| 2019/0369641 A1* | 12/2019 | Gillett ................. G05D 1/0212 |
| 2020/0372464 A1 | 11/2020 | Kim et al. |
| 2020/0402629 A1* | 12/2020 | Austring et al. ..... G06Q 50/265 |
| 2021/0387808 A1* | 12/2021 | Kalouche ............. G06Q 10/083 |
| 2022/0250528 A1 | 8/2022 | Iwamoto et al. |
| 2022/0292436 A1 | 9/2022 | Kawaguchi et al. |
| 2022/0309454 A1 | 9/2022 | Kim et al. |

\* cited by examiner

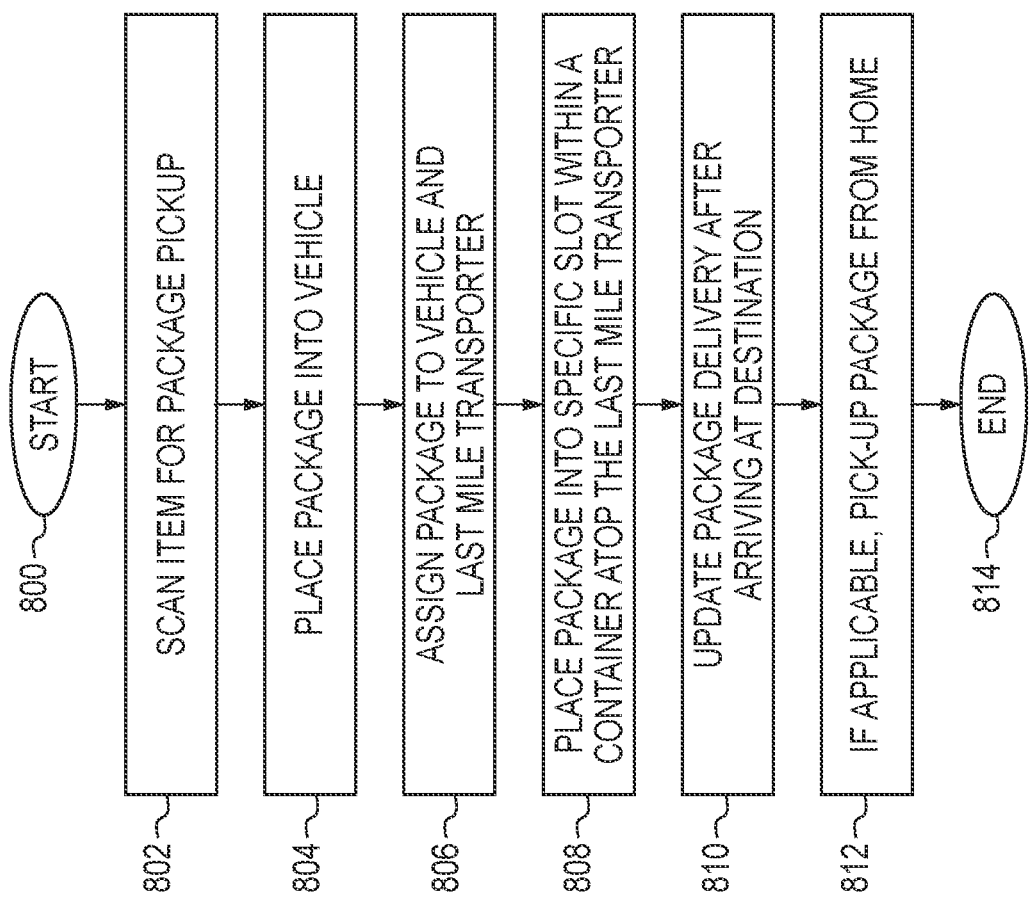

SYSTEMS, APPARATUSES AND METHODS FOR A TIERED STRUCTURE TO MANAGE A CHAIN OF CUSTODY FOR PACKAGE DELIVERY

BACKGROUND

Package thefts may occur at any point within a chain of custody. Typically, packages may be loaded at a transfer hub into a vehicle. The vehicle may then drive to a location where the packages are delivered. Delivery typically occurs when it is placed at the destination. At any point, these packages may be subjected to theft. At its core, chain of custody refers to the documentation and procedures ensuring the accurate and secure handling of transported goods from origin to destination.

When thefts occur, it is hard to identify at what point in the chain of custody it may have occurred. For example, between destinations, the package may have been stolen when the vehicle that the package is in is taken while the person delivering the package is out on another delivery. Thefts may also occur on the door step of a victim.

The present disclosure provides for systems, apparatuses and methods for a tiered structure to manage a chain of custody for package delivery that addresses the above identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a vehicle is provided that may include a transmitter, at least one processor, and a memory operatively coupled to the processor, the memory storing program instructions that when executed by the processor, causes the processor to perform processes. The processes may include connecting the vehicle with a last mile transporter, wherein the last mile transporter is coupled to a container for housing at least one package. The transmitter may provide a chain of custody of the at least one package between the vehicle, last mile transporter, and the container.

In accordance with another aspect of the present disclosure, a system is provided that may include a transmitter on a transporter and a transmitter on a container, the container for placement on the transporter. In addition, the system may include a management system in communication with the transmitter on the transporter and the transmitter on the container for creating a record of ownership for at least one package placed within the container from an origin to a destination.

In accordance with yet another aspect of present disclosure, a method for managing a location of a package is provided. The method may include receiving an identifier of the package, associating a container for which the package has been inserted into with a record, associating a last mile transporter for which the container has been placed onto with the record, and transmitting the record for managing the location of the package.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 8 is a flow chart showing illustrative processes for providing a chain of custody for package delivery in accordance with one aspect of the present disclosure.

DESCRIPTION OF THE DISCLOSURE

Figure 1:
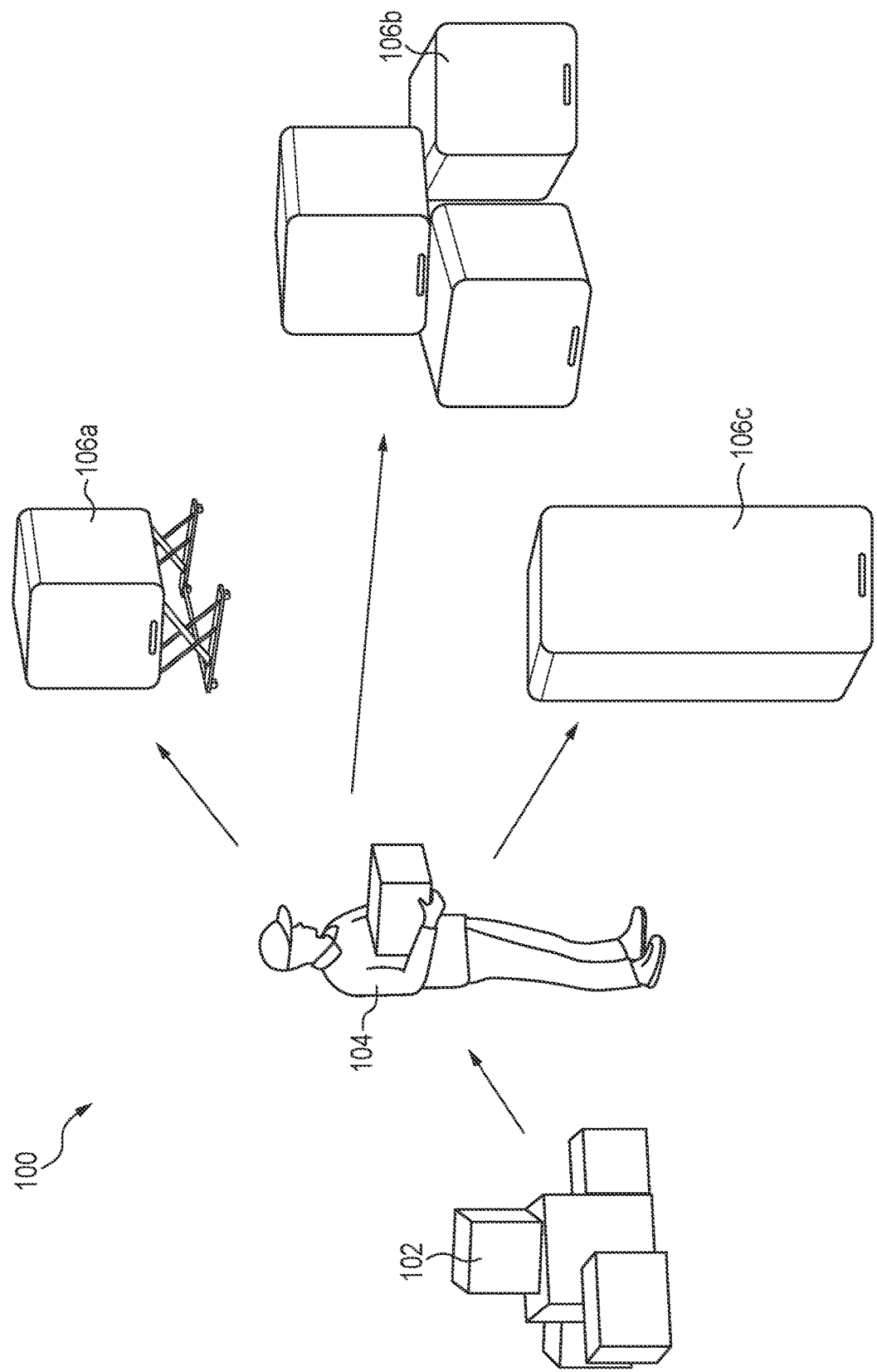
FIG. 1 is a schematic diagram of an initial pickup of packages and placement into corresponding containers in accordance with one aspect of the present disclosure.

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to systems, apparatuses and methods for a tiered structure to manage a chain of custody for package delivery. More particularly, this disclosure describes a last mile transporter for package deliveries whereby package whereabouts are monitored through transmitters. In an illustrative embodiment, a vehicle, last mile transporter, and container each have a transmitter. The three transmitters may be used for tracking a package that is placed in the container. A chain of custody may be created when the at least one package is placed in the container. The container may be placed atop the last mile transporter. There is thus a relationship between the container and the transporter. In turn, the vehicle may also be in communication with the container and the transporter. Each device may be used to manage the package location through their appropriate transmitters.

Numerous other modifications or configurations to the systems, apparatuses and methods for the tiered structure to manage the chain of custody for package delivery will become apparent from the description provided below. For example, while a vehicle, transporter and container were described for moving the package, hubs, which are centralized distribution points, may also provide documentary evidence for the chain of custody. Advantageously, managing a package's location may be more easily determined through the transmitters on each of the associated devices. Other advantages will become apparent from the description provided below.

The tiered structure relates to certain transmitters providing information, associating devices with one another, logging information in, and then providing it to a requesting party. Certain actions may warrant input into a record to maintain a chain of custody. The chain of custody relates to an association between the three devices as shown in Table 1 below:

TABLE 1

| Transmitter | Action | Record |
| --- | --- | --- |
| Vehicle (Top Tier) | Load transporter into vehicle | Associate transporter with vehicle |
| Transporter (Middle Tier) | Unloaded from vehicle | Associate transporter with vehicle and container |
| Container (Bottom Tier) | Unfolded and loaded onto transporter | Associated container with transporter and/or vehicle. |

Using tiers, the record associated with the chain of custody may be kept tracked of. For example, the Top Tier may maintain a number of Middle Tier Records, that is, the vehicle may maintain a number of last mile transporters. The Middle Tier may maintain a number of Bottom Tiers, which coincides with a last mile transports capable of handling a number of containers. The associations between the tiers may be communicated with one another through transmitters coupled to the vehicles, transporters, and containers.

With reference now to FIG. 1, a schematic diagram 100 of an initial pickup of packages 102 and placement into corresponding containers 106a, 106b, and 106c (collectively containers 106) in accordance with one aspect of the present disclosure is provided. The packages 102 may originate from a vendor or other party who wishes to transport their goods through the service described herein. The packages 102 may come in many different shapes, sizes, textures, colors and the like.

Typically, the packages 102 may originate from various locations. For example, the packages 102 may be set aside by a vendor for pickup. Packages 102 may also be provided by a manufacturer. The packages 102 may also be provided at hubs or may be picked up at a destination. For example, the package 102 may be set in front of a user's door for pickup by the handler 104. Returns may be made through this.

An identifier, or other marker, may be associated with the packages 102. When scanned, this information may be relayed to a management system. The handler 104 may use their scanning device, for example, a dedicated device, phone, tablet, or the like. Information may be shown to the handler 104 after it has been picked up on their device. This information may indicate which container 106 to place the package 102 into. For example, smaller and lighter packages 102 may be placed into one type of container 106a while heavier packages 102 may be placed into another type of container 106c.

Packages 102 may be placed into different containers 106 based on final destinations. The packages 102 may be grouped together based on geographic regions or another commonality. Packages 102 and containers 106 may also be dependent on the last mile transporter and how much it may hold.

When scanned and placed into a container, the package 102 may enter into a chain of custody for tracking the location of the package 102. The location of the package 102 may be tracked when the package 102 is placed into the container as the container may include a transmitter. A management system connected with the transmitters may monitor the movement of a delivery. The system may monitor the packages 102 that are delivered or picked up by the transporter and associate them with the container 106.

Figure 2:
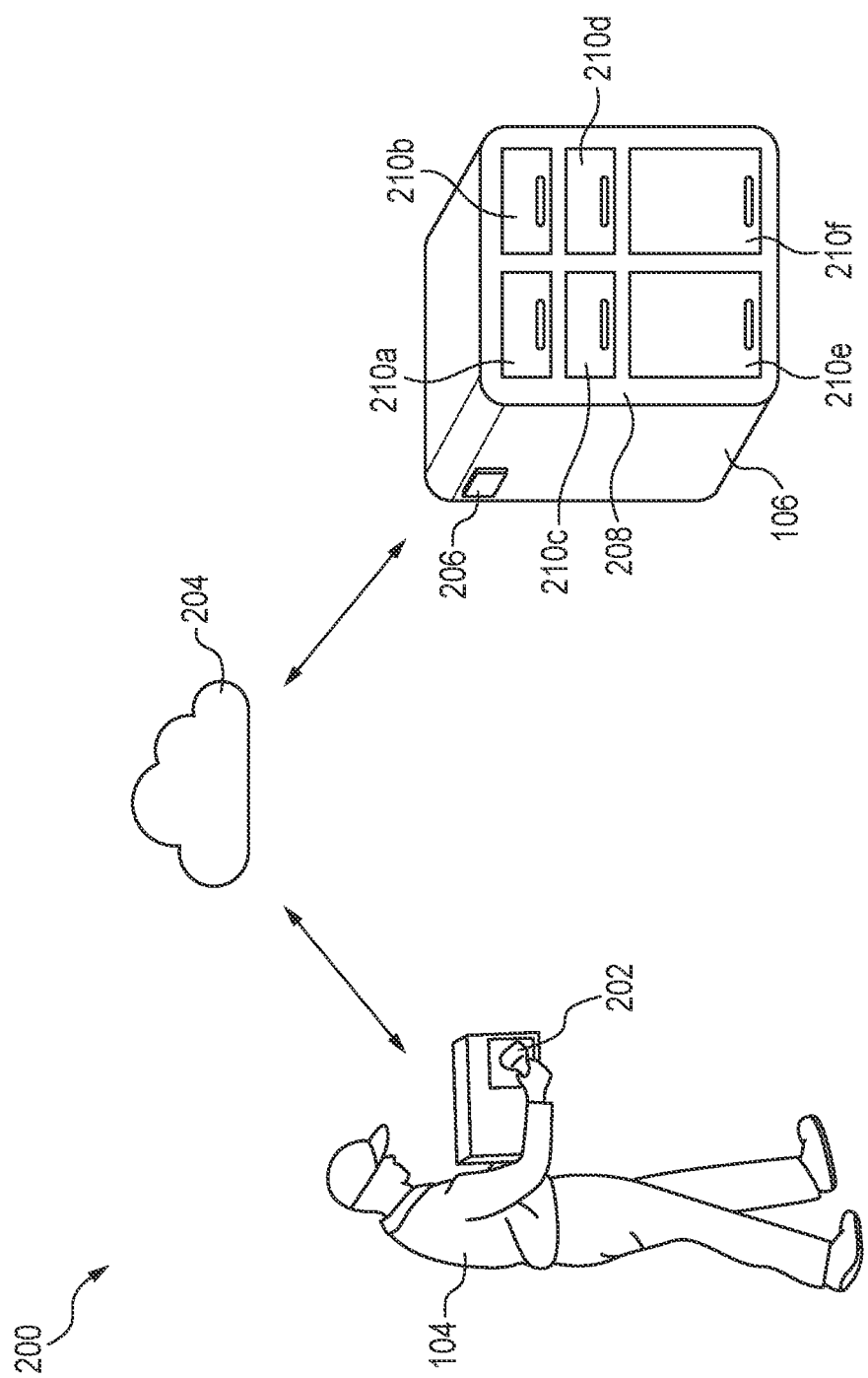
FIG. 2 is a schematic diagram of scanning a package for placement into a specific slot of a container in accordance with one aspect of the present disclosure.

FIG. 2 is a schematic diagram 200 of scanning a package for placement into a specific slot 210a, 210b, 210c, 210d, 210e or 210f (collectively slots 210) of a container 106 in accordance with one aspect of the present disclosure. To properly track packages, the handler 104 may place the packages into specific slots 210. Depending on the scan of the item, different slots in the container may be opened automatically. The system may check an image of the package to determine whether it has been placed into the right slot of the container.

After identifying the package with a scanner 202, the handler 104 may be given an indication of which slot 210 to place the package into. There may be a designated slot 210. This designation may be based on the size of the package, final destination, or other criteria.

Slot information may be provided through a network 204. The network 204 may be used to access servers, third party sites, and the like. Package configuration may be known once the package is scanned in by the handler 104. Information about the container 106 may be accessed through the network 204. Based on this, a proper slot 210 within the container 106 may be identified to place the package into.

In one example, a hammer may fit only certain containers 106 having a unique slot 210c. This slot 210c may be padded such that the hammer would not cause damage to the integrity of the container 106. This matching and analysis may be performed by the network 204, for example, on the cloud. Communications may occur through the transmitter 206 to the network 204.

Communications may occur across any type of wired or wireless system through a network 204 having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, vehicle to cloud communications, among others.

Computer communications may utilize any type of wired, wireless, or network communication protocol including, but not limited to, Ethernet (e.g., IEEE 802.3), Wi-Fi (e.g., IEEE 802.11), communications access for land mobiles (CALM), WiMAX, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

In one embodiment, the slots 210 may be automatically opened after being scanned. This may indicate to the handler 104 that the package should be placed into a specific slot 210. Automated actuators may receive signals from a transmitter 206 on the container 106. The slots 210 may be lowered when the package has been placed into the appropriate slot 210. More than one slot 210 may open at a time. A layout of where to place the package may also be shown on the scanner 202.

In one embodiment, the container 106 may have a front opening 208. Through this opening 208, the handler 104 may be used to load the entirety of the packages at once. This might be easier to load the container 106 when there are numerous packages that need to be fit within the container 106. The information may be automatically communicated through the transmitter 206 via the network 204. Thus, the packages may be tied to a container 106 after scanning and being placed into a specific slot 210.

The transmitter 206 on the container 106 may then be tied to a record with the package identifier scanned by the scanner 202. This record may be created and stored on the network 204, cloud, or other remote management system that tracks the chain of custody of the package. The chain of custody of the package may be identified through the record. This information may be transmitted via the transmitter 206 on the container 106.

Figure 3:
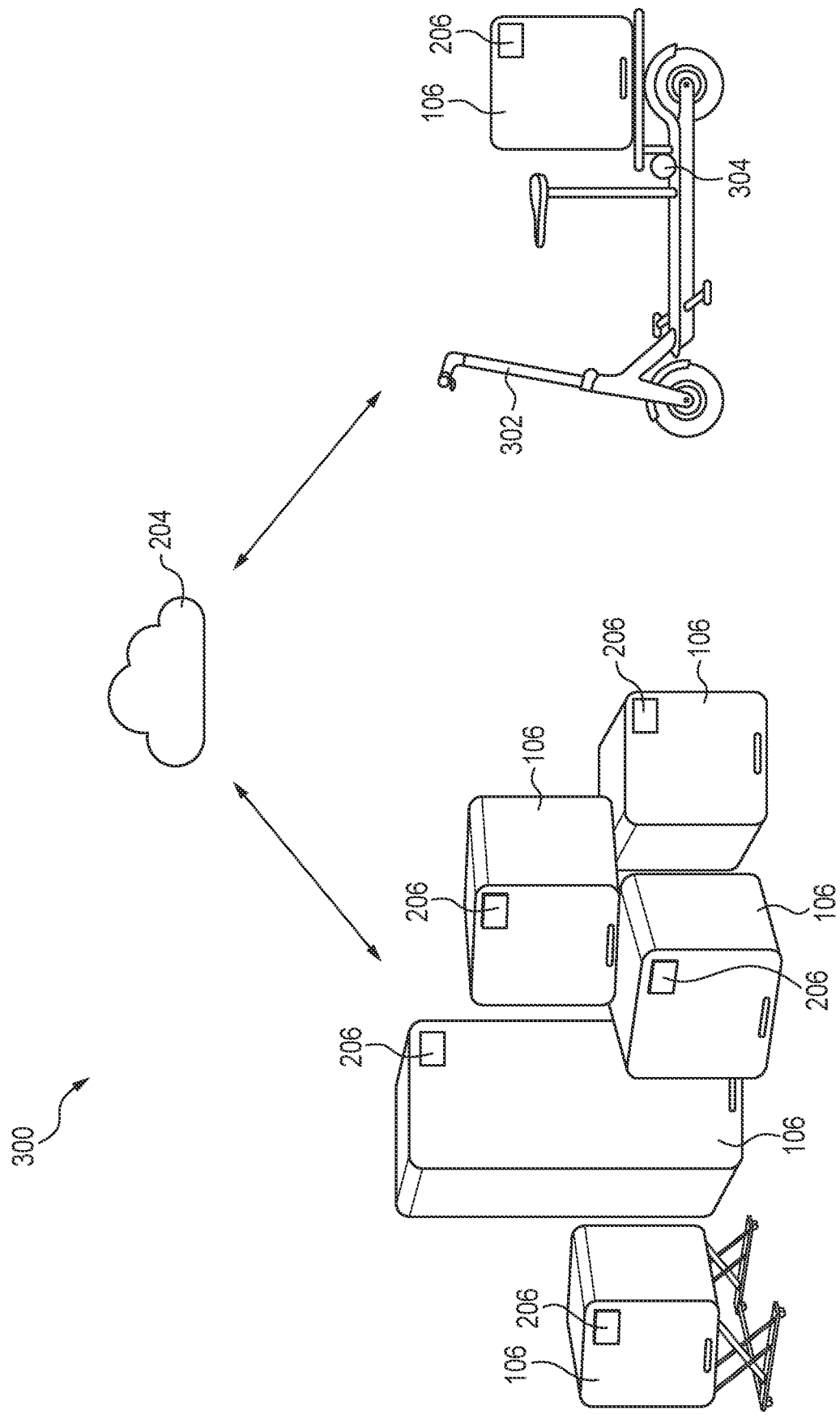
FIG. 3 is a schematic diagram of the container placement on a last mile transporter in accordance with one aspect of the present disclosure.

FIG. 3 is a schematic diagram 300 of the container 106 placement on a last mile transporter 302 in accordance with one aspect of the present disclosure. The container 206 may be placed atop the last mile transporter 302. The transporter 302 may take on the form of an electric mobility device. Pedal assist on the transporter 302 may be provided. A battery may be used which is placed in a central or front portion of the transporter 302 that provides power to an electric motor of the transporter 302.

When connected, the transmitter 206 on the container 106 may communicate with the transmitter 304 on the transporter 302. This may either be through the network 204, or through direct communications with one another. In one embodiment, when the last mile transporter 302 and the container 106 are connected to one another, an automated link may be established and noted within the record that was created earlier when the package was placed into the container 106. That is, the record may be updated to reflect that the package is not only in the container 106 but also associated with the transporter 302 on which the container sits atop of. By linking these together, the chain of custody may be updated to reflect on how the package is being delivered to a destination site, that is, the last mile transporter 302.

Both transmitters 206 and 304 may communicate with the network 204 directly to provide record information or may coordinate with one another. For example, the information regarding the container 106 (including the packages contained therein), may be used and provided to the transmitter 304 on the last mile transporter 302. As an example, the transaction may go from package to container 106 to transporter 302. The record may indicate that now there is a container 106 and transporter 302. Location information on the combination may be provided to the management system.

Figure 4:
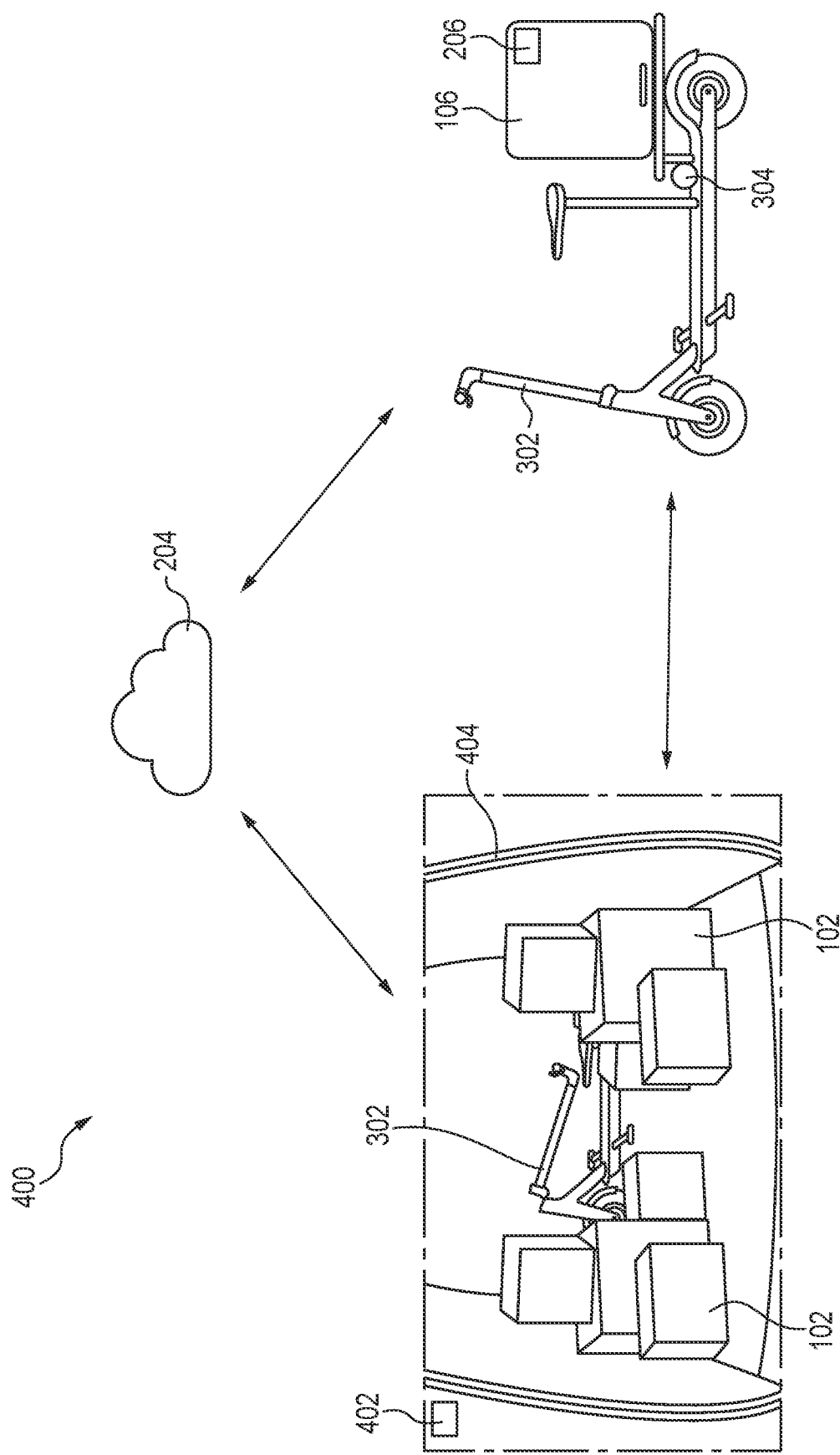
FIG. 4 is a schematic diagram showing packages from a vehicle placed onto the last mile transporter in accordance with one aspect of the present disclosure.

FIG. 4 is a schematic diagram 400 showing packages 102 from a vehicle 404 placed onto the last mile transporter 302 in accordance with one aspect of the present disclosure. Previously, the chain of custody was related to the container 106 and the transporter 302. The vehicle 404 may also be part of the chain of custody of the package. Through the vehicle 404, transporter 302, and container 106, a three-tiered structure may be established where records may be kept and packages may be tracked.

A transmitter 402 may be located on or within the vehicle 404. The transmitter 402 may be powered by the vehicle's battery or other alternative power source. The transmitter 402 may take the form of a transmission control unit 402. The transmitter 402, as will be shown, may be in communication with the network 204 and the transmitter 304 of the transporter 302 and the transmitter 206 of the container. The vehicle 404 may be used to charger the transporter 302 while it is resting within it through a wireline or wireless connection.

In one embodiment, a scanner may be provided in the vehicle 404 to determine which packages 102 have been picked up and that are outgoing. Object recognition technologies may be used. By recognizing the specific packages 102 that are being placed into the container 106, the management system may document information about each step of the process.

Each of the components may communicate with one another including the transmitter 402 on the vehicle 404, transmitter 304 on the last mile transporter 302, and the transmitter 206 on the container 106. They may either communicate directly or through the network 204. In one example, there might not be a network connection and as such the vehicle 404 might itself be used to keep the chain of custody and management system to track packages.

In one example of the described system, the package 102 may be picked up as a gig service worker who wants to deliver the package 102 for additional income. The packages 102 in this embodiment may be loaded into the trunk of a vehicle 404 at a centralized distribution center.

The last mile transporter 302 may be folded into the back of the vehicle 404. Multiple configurations for collapsing the transporter 302 may be used. Packages 102 may be placed around the transporter 302. In addition, the containers 106 described earlier may be folded and in a collapsed state. In one embodiment, the containers 106 may be pre-filled and loaded into the back of the vehicle 404 depending on the size of the vehicle.

The network 204 may connect all three devices together: the vehicle 404, the last mile transporter 302 and the container 106. The record of the package being associated with all three may be kept in a record associated with the chain of custody. For example, the record may include the times and dates that the package 102 was within each.

The transmitters 206, 304, and 402 may communicate with one another. In another example, the transmitter 206 in the container 106 may communicate only with the transmitter 304 of the transporter 302 that it has been assigned to or resting atop of. When the container 106 is atop of the transporter 302, an automated connection or link may be established with one another. The two may then communicate with only one of the transmitters 304 or 206. The transmitters 402, 206 and 304 may provide indicators or other information on which device it is associated with. By providing this information, the package may be properly tracked.

Figure 5:
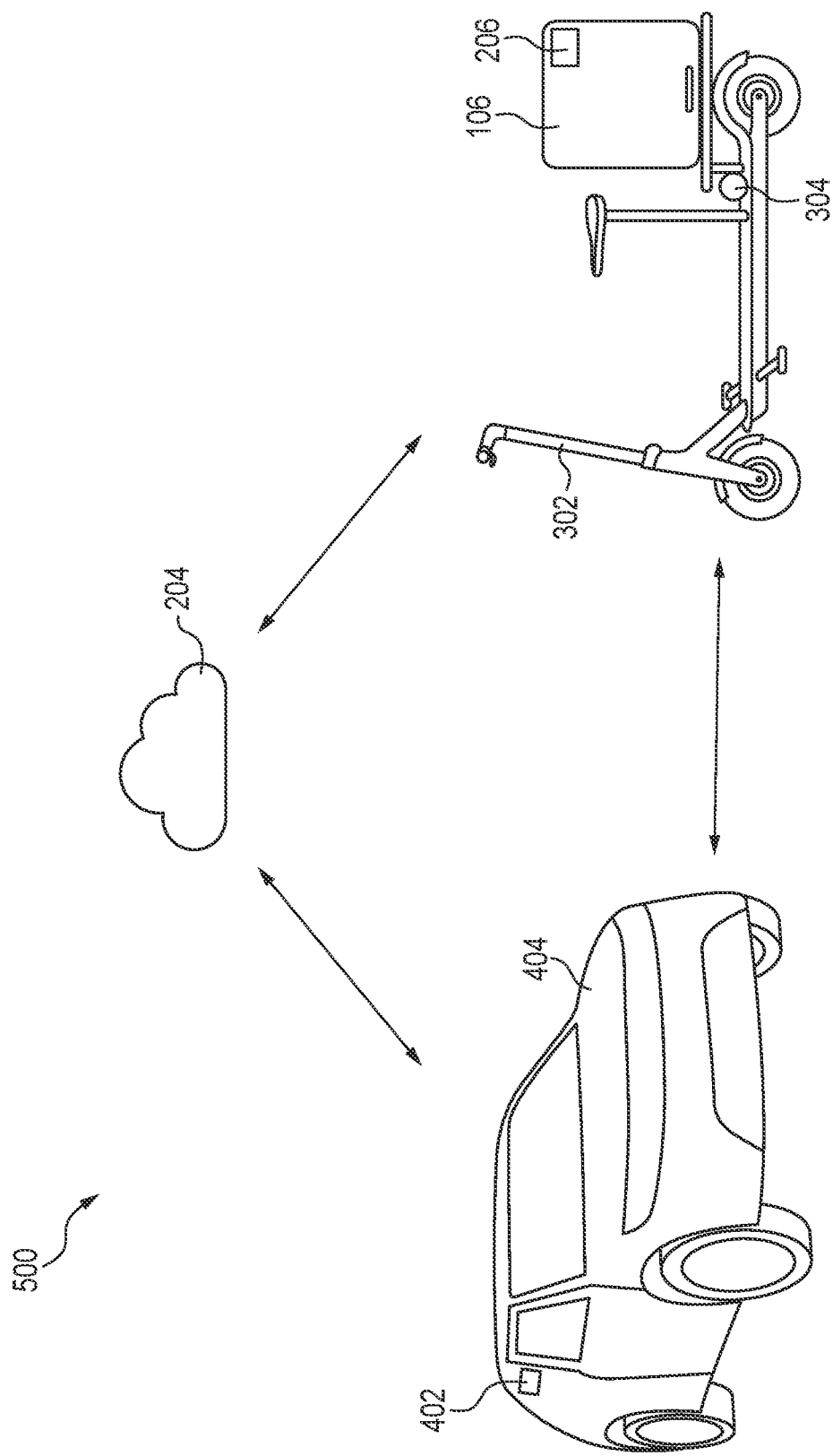
FIG. 5 is a schematic diagram showing transmissions from the vehicle, the container, and the last mile transporter holding the container in accordance with one aspect of the present disclosure.

FIG. 5 is a schematic diagram 500 showing transmissions from the vehicle 404, the container 106, and the last mile transporter 302 holding the container 106 in accordance with one aspect of the present disclosure. After packages are loaded into the vehicle, the vehicle 404 may be driven to or near the package's final destination. Information may be provided from the vehicle 404 through the transmitter 402 about its whereabouts when it is driving towards the destination.

The transporter 302 may be used for the last portion of the trip to deliver the packages. For example, the vehicle 404 may stop at a parking facility and the transporter 302 may be sent for package deliveries for the last few miles. The handler may take the packages from the vehicle 404 and then expand the collapsed transporter 302 from within the vehicle. The folded containers 106 may also be taken out and expanded. The containers 106 may then be placed atop the transporter 302.

At each process, the package may be accounted for when it leaves the vehicle 404 and placed into the container 106 atop the last mile transporter 302. This may occur through the transmitter 402 on the vehicle 404, the transmitter 304 on the transporter 302, and the transmitter 206 on the container 106.

Figure 6:
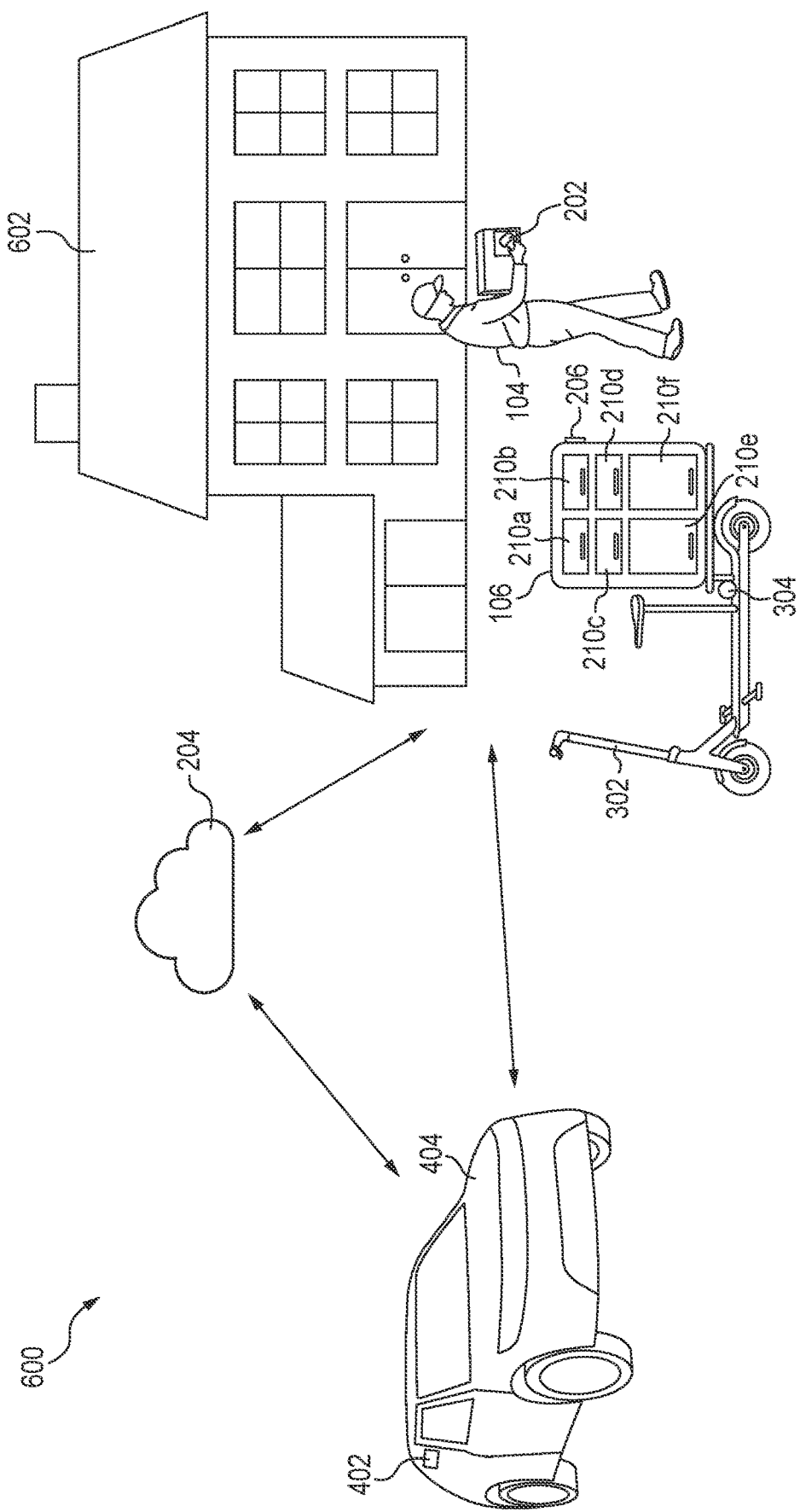
FIG. 6 is a schematic diagram showing package delivery to its final destination in accordance with one aspect of the present disclosure.

FIG. 6 is a schematic diagram 600 showing package delivery to its final destination in accordance with one aspect of the present disclosure. After the vehicle 404 arrives at or near the destination, the vehicle 404 may provide that it has stopped through its transmitter 402 to the network 204. The vehicle 404 may also keep in communication with the last mile transporter 302 or indirectly through the network 204. This may be performed through the transmitter 304 on the transporter 302.

At the destination 602, the transmitter 206 on the container 106 may be used to open one of the slots 210. The slots 210a, 210b, 210c, 210d, 210e, or 210f may open automatically. This may be performed automatically after reaching the destination in order to prevent inadvertent package deliveries or misplaced items. A handler 104 would scan the package 102 and then deliver it to the destination 602. Once this is performed, the record or chain of custody may be completed. Throughout the process, the package 102 whereabouts were maintained by using the three-tiered structure.

Figure 7:
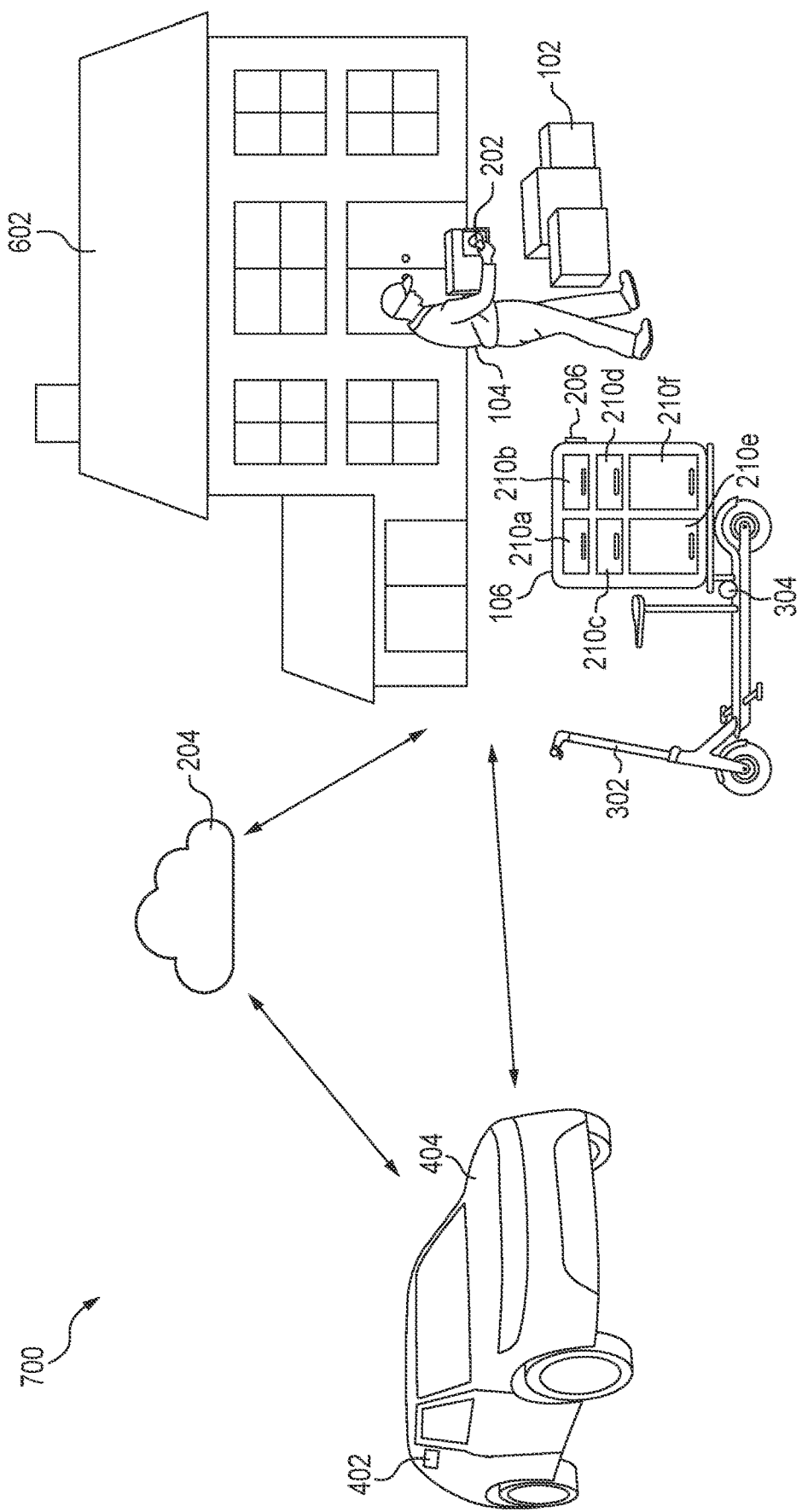
FIG. 7 is a schematic diagram showing package pickups from its origin in accordance with one aspect of the present disclosure.

FIG. 7 is a schematic diagram 700 showing package 102 pickups from its origin in accordance with one aspect of the present disclosure. Oppositely, the chain of custody and the record may begin at a user's house 602. The handler 104 may scan the package 102 through a scanner 202. This may create a record within a chain of custody.

The container 106 with its slots 210a, 210b, 210c, 210d, 210e, and 210f may be used to place the package 102 into. A specific slot 210 may be opened automatically when the handler 104 scans the package 102 in. A label may be provided on the package 102 whereby custody may be taken of the package 102. The label may be printed by the handler 104 and affixed or attached to the package 102.

When the slot 210 is opened and closed information may be transmitted directly through the network 204 by the transmitter 206 of the container 106 or indirectly through the transmitter 304 on the transporter 302. In one embodiment, the network 204 may not be available and either the transmitter 206 on the container 106 or the transmitter 304 on the transporter 302 may directly contact the vehicle 404 through its transmitter 402. The chain of custody with the container 106, transporter 302 and the vehicle 404 may thus be established through these connections.

After the package 102 has been placed into the container 106, the handler 104 may ride the transporter 302 back to the vehicle 404. The handler 104 may then at their vehicle load the packages 102 into the vehicle 404 or they may load the entirety of the container 106 into it. The vehicle transmitter 402 may then be used to indicate that it has the package and may be returning the item to the warehouse, shipping center or hub where it may be further packaged. This describes record keeping and the chain of custody for the package 102 with respect to a return of the package 102.

Turning to FIG. 8, a flow chart showing illustrative processes for providing a chain of custody for package delivery in accordance with one aspect of the present disclosure is provided. Fewer or more processes may be used depending on the scope of the intended uses. The processes may begin at block 800.

At block 802, and when the package is getting delivered to a destination and a chain of custody is to be used, the package may be scanned for a pickup. This may be at the packaging center or hub. Alternatively, this may occur at someone's house or where goods are sold and need to be transported to a destination.

At block 804, the package may be placed into the vehicle after scanning. At block 806, the package may be assigned to the vehicle and the last mile transporter. When the package is placed into the vehicle, a chain of custody and record may be created. The package may be associated with the transporter and the vehicle. A container may be assigned for the package. The container may be preloaded with the package or may be assigned when the package is placed into a container.

At block 808, and after arriving at or near the destination where the package is to be dropped off, the package may be deposited in a specific slot within a container atop the last mile transporter. When the package is scanned, a description may be given in which slot to deposit the package into. The package may be confirmed to be placed into the container through a scanner. That is, a scanner may be associated with the container and its specific slots. The slots may be opened automatically to help guide the handler to place the package into.

At block 810, the package may be dropped off at the destination. The package delivery may be updated after arriving at the destination. This may include updating the record within the chain of custody for the package that was transported through the container atop the last mile transporter and the vehicle that drove to or near the final destination. The update may include the transmission of the record to a management system to show that the transfer of the package has been completed. This may indicate that the package has been delivered and its whereabouts have been tracked from origin to destination.

At block 812, and if applicable, packages at the destination may be picked up. From there another chain of custody may be created after the package is scanned and loaded into the container atop the last mile transporter. This may occur in returned item situations. A tiered structure approach may be used to track the location of the package through the processes described above with the use of the container having a transmitter, the last mile transporter having a transmitter, and the vehicle having a transmitter. The processes may end at block 814.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system, comprising:
    a transmitter on a transporter;
    a transmitter on a container, the container for placement on the transporter, wherein
        the container includes a plurality of slots,
        at least one slot of the plurality of slots houses at least one package; and
    a management system located on a vehicle in communication with the transmitter on the transporter and the transmitter on the container for creating a record of ownership for the at least one package placed within the container from an origin to a destination,
        wherein the record provides information about a time at which the container is coupled to the transporter, and information about times and locations at which the at least one slot is opened and closed;
        wherein the transmitter on the container and the transmitter on the transporter are configured to communicate directly without a network, such that the record of ownership is autonomously updated by either transmitter;
    wherein the time at which the container is coupled to the transporter is automatically recorded in response to a detected physical coupling event;
    wherein the transporter is collapsible into a trunk of the vehicle.

2. The system of claim 1, wherein the vehicle establishes a local area network to communicate with the transmitter on the transporter and the transmitter on the container.

3. The system of claim 1, wherein a three-tiered structure is created for the record of ownership.

4. A method for managing a location of a package, the method comprising:
    receiving an identifier of the package;
    associating a container for which the package has been inserted into with a record, wherein
        the container includes a plurality of slots, and
        at least one slot of the plurality of slots houses the package;
    associating a last mile transporter for which the container has been placed onto with the record;
    transmitting the record for managing the location of the package, wherein
        the record provides information about a time at which the container is coupled to the last mile transporter, and information about times and locations at which the at least one slot is opened and closed;
        wherein the record is updated based on direct communication between the container and the transporter in the absence of a network connection, such that a chain of custody is established without reliance on a central system; and
    wherein the time at which the container is coupled to the last mile transporter is automatically recorded in response to a physical coupling detection.

5. The method of claim 4, comprising associating a vehicle for which the last mile transporter is placed into with the record before transmitting the record for managing the location of the package.

6. The method of claim 4, wherein the record represents a chain of custody.

7. The method of claim 4, wherein the last mile transporter is collapsible.

8. The method of claim 4, further comprising closing the record when the location of the package has reached a destination.

* * * * *